United States Patent
Ryu et al.

(10) Patent No.: US 9,851,491 B2
(45) Date of Patent: Dec. 26, 2017

(54) DISPLAY DEVICE

(71) Applicant: Samsung Display Co., Ltd., Yongin, Gyeonggi-Do (KR)

(72) Inventors: Suchang Ryu, Yongin-si (KR); Luly Lee, Yongin-si (KR); Sehee Jeon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 107 days.

(21) Appl. No.: 14/746,409

(22) Filed: Jun. 22, 2015

(65) Prior Publication Data
US 2016/0116659 A1  Apr. 28, 2016

(30) Foreign Application Priority Data
Oct. 23, 2014 (KR) .................. 10-2014-0144400

(51) Int. Cl.
*F21V 8/00* (2006.01)

(52) U.S. Cl.
CPC .......... *G02B 6/005* (2013.01); *G02B 6/0066* (2013.01); *G02B 6/0073* (2013.01); *G02B 6/0088* (2013.01)

(58) Field of Classification Search
CPC ......... G02F 1/133308; G02F 1/133615; G02F 2001/133317; G02B 6/005; G02B 6/0066; G02B 6/0073; G02B 6/0088; G02B 6/0085
USPC ... 362/633, 632, 634, 611, 612, 97.1, 23.15, 362/311.01; 349/58, 65, 60, 62
See application file for complete search history.

(56) References Cited

U.S. PATENT DOCUMENTS

| | | | | |
|---|---|---|---|---|
| 6,392,724 B2 * | 5/2002 | An | ................. | G02B 6/0088 349/58 |
| 7,184,110 B2 * | 2/2007 | Kim | ................. | G02F 1/133608 349/58 |
| 7,224,416 B2 * | 5/2007 | Cha | ................. | G02B 6/0088 349/58 |
| 7,821,591 B2 | 10/2010 | Lee | | |
| 8,147,113 B2 * | 4/2012 | Hamada | ................. | G02B 6/0085 362/218 |
| 8,267,569 B2 * | 9/2012 | Hamada | ................. | G02B 6/0085 362/612 |
| 8,757,861 B2 * | 6/2014 | Kim | ................. | H04M 1/0266 362/632 |
| 9,488,770 B2 * | 11/2016 | Horiguchi | ................. | G02B 6/0055 |
| 2012/0050645 A1 * | 3/2012 | Okada | ................. | G02F 1/133611 349/64 |

(Continued)

FOREIGN PATENT DOCUMENTS

| KR | 10-2005-0113479 A | 12/2005 |
|---|---|---|
| KR | 10-2013-0046865 A | 5/2013 |
| KR | 10-2014-0056490 A | 5/2014 |

*Primary Examiner* — Anh Mai
*Assistant Examiner* — Arman B Fallahkhair
(74) *Attorney, Agent, or Firm* — H.C. Park & Associates, PLC

(57) ABSTRACT

A display device includes: a display panel; a light source configured to provide light to the display panel; a bottom chassis on which the light source is disposed; a mold frame coupled to the bottom chassis and comprising a projection; and a light conversion sheet disposed between the display panel and the bottom chassis. The light conversion sheet may have, at an edge portion thereof, a coupling hole into which the projection is inserted.

16 Claims, 8 Drawing Sheets

(56) References Cited

U.S. PATENT DOCUMENTS

| | | | |
|---|---|---|---|
| 2013/0155717 A1* | 6/2013 | Jeong | G02F 1/133308 362/602 |
| 2013/0265522 A1* | 10/2013 | Jung | G02F 1/1336 349/61 |
| 2014/0119049 A1 | 5/2014 | Kim et al. | |

* cited by examiner

DISPLAY DEVICE

CLAIM OF PRIORITY

This application claims priority to and all benefits accruing under 35 U.S.C. §119 from the Korean Patent Application No. 10-2014-0144400, filed on Oct. 23, 2014 with the Korean Intellectual Property Office, the disclosure of which is incorporated herein in its entirety by reference.

BACKGROUND OF THE INVENTION

Field of the Invention

The present invention relates to a display device preventing light leakage of blue light.

Description of the Related Art

A liquid crystal display (LCD) is a type of flat panel display (FPD), which is most widely used these days. The LCD comprises two substrates, including electrodes formed thereon, and a liquid crystal layer interposed therebetween. Upon applying voltage to two electrodes, liquid crystal molecules of the liquid crystal layer are rearranged, thereby adjusting an amount of transmitted light. Since the liquid crystal display panel provided in the LCD device is a non-light emitting element, a backlight unit is further provided so as to provide light. The backlight unit may be categorized into an edge-type and a direct-type according to position of the light source. The edge-type backlight unit may include light sources on a side surface of a light guide plate.

Meanwhile, in recent years, LED light sources characterized in low power consumption and high efficiency have been widely used. The LED light source may emit blue light and provide white light using additional color converting materials. Accordingly, the blue light may be later converted into white light to provide full color display using a color filter of the LCD panel, which leads to studies on improving color reproducibility of blue light.

In the case of the edge-type backlight unit, a side surface portion of a light guide plate adjacent to a light source is called a light incident portion and a side surface portion disposed opposite the light incident portion is called a light emitting portion. Blue light emitted from the light source may pass through a light conversion sheet so that the blue light can be converted into white light, thereby providing high color reproducibility. However, blue light that is not converted to white light may leak through gaps between the light emitting portion and a mold frame, and between the mold frame and an optical sheet, and then may be incident on a display panel. The blue light incident on the display panel may lead to low color reproducibility of display devices.

It is to be understood that this background of the technology section is intended to provide useful background for understanding the technology and, as disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Embodiments of the present invention are directed to a display device capable of preventing light leakage of blue light through an edge portion thereof.

According to an exemplary embodiment, a display device comprises: a display panel; a light source configured to provide light to the display panel; a bottom chassis on which the light source is disposed; a mold frame coupled to the bottom chassis and comprising a projection; and a light conversion sheet between the display panel and the bottom chassis. The light conversion sheet may have, at an edge portion thereof, a coupling hole into which the projection is inserted.

The mold frame may include: a support on which the display panel is disposed; and a sidewall portion bent from one surface of the support. The projection may protrude from the sidewall portion.

The sidewall portion may have an inserting hole and the projection is disposed in the inserting hole.

The projection may have a thickness less than that of the sidewall portion.

The light conversion sheet may include a sheet body and a sheet guide unit extending outwardly of the sheet body. The sheet guide unit may have a coupling hole into which the projection is inserted.

The sheet guide unit may be disposed in the inserting hole.

The mold frame may further include a locking protrusion bent from the support and coupled to the bottom chassis.

The bottom chassis may further include a bottom portion and a side surface portion bent from the bottom portion.

The sidewall portion may be disposed between the side surface portion of the bottom chassis and the light guide plate.

The side surface portion may be disposed between the sidewall portion of the mold frame and the locking protrusion.

The sidewall portion may be in contact with the side surface portion of the bottom chassis.

The sidewall portion and the sheet guide unit may be in contact with the side surface portion of the bottom chassis.

The sheet guide unit may be disposed on a top surface of the side surface portion of the bottom chassis.

The display device may further include a light guide plate disposed between the bottom chassis and the light conversion sheet and configured to direct light emitted from the light source to the display panel.

The light conversion sheet may have a size larger than that of the light guide plate.

The display device may further include an optical sheet between the light guide plate and the display panel.

The light conversion sheet may have a size larger than that of the optical sheet.

According to another exemplary embodiment, a display device comprises: a display panel; a light source configured to provide light to the display panel; a bottom chassis on which the light source is disposed, the bottom chassis comprising a locking projection; and a light conversion sheet between the display panel and the bottom chassis. The light conversion sheet may have, at an edge portion thereof, a coupling hole into which the locking projection is inserted.

The bottom chassis may have a bottom portion and a side surface portion bent from the bottom portion. The side surface portion may have a locking hole.

The locking projection may be disposed at the locking hole.

The light conversion sheet may include a sheet body and a sheet guide unit extending outwardly from the sheet body. The sheet guide unit may have a coupling hole into which the locking projection is inserted.

According to embodiments of the present invention, a display device may convert blue light leaking between an optical sheet and a mold frame into white light, thereby improving color reproducibility.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
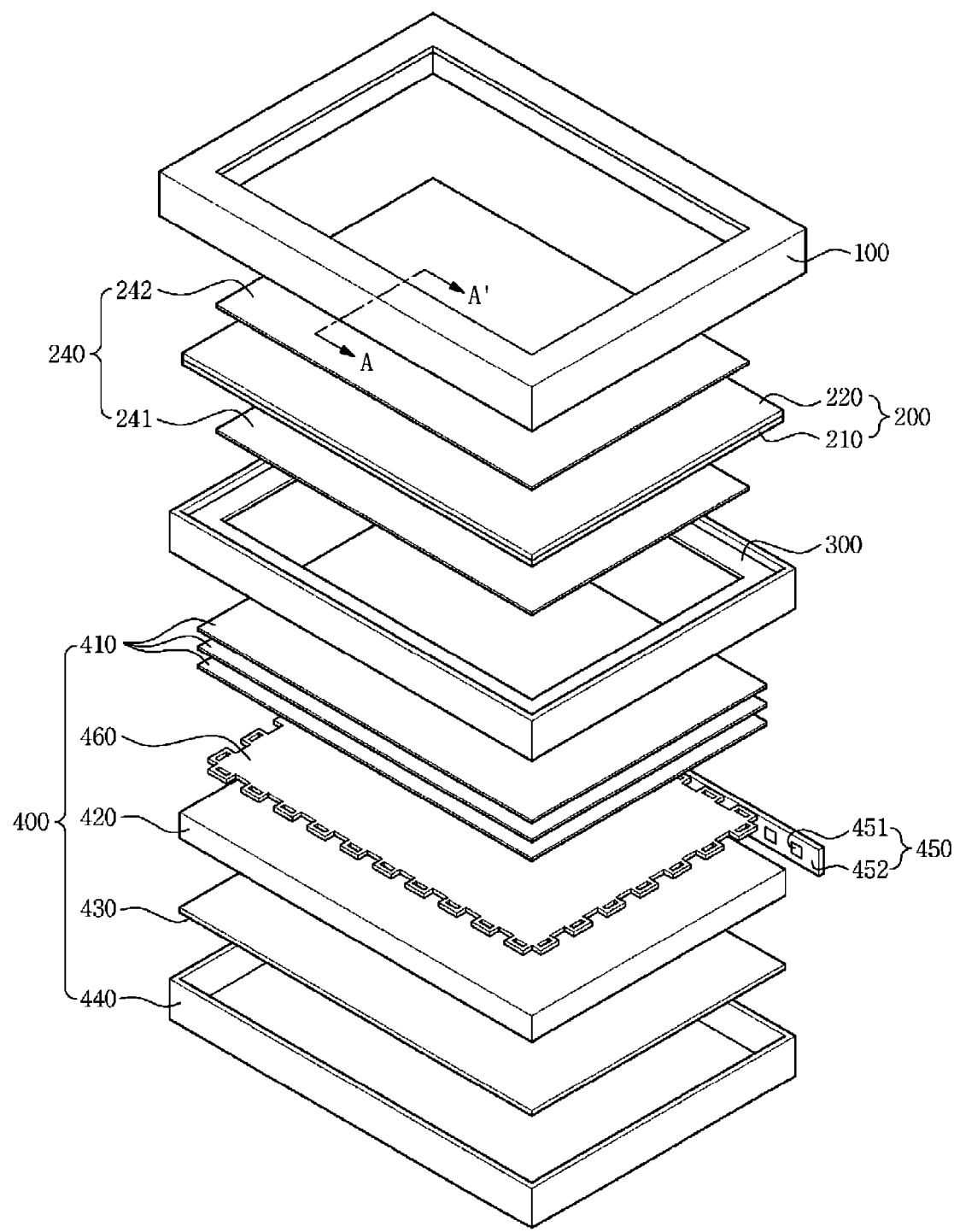
FIG. 1 is a schematic exploded perspective view illustrating a display device according to a first exemplary embodiment of the invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments of the invention and may be modified according to the relevant art and the intention of the Applicant. Therefore, the terms used herein should be interpreted as having a meaning that is consistent with their meanings in the context of the present disclosure, and is not intended to limit the invention. As used herein, the singular forms "a," "an," and "the" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to a first exemplary embodiment is described below in detail with reference to FIGS. 1 to 7B.

Figure 2:
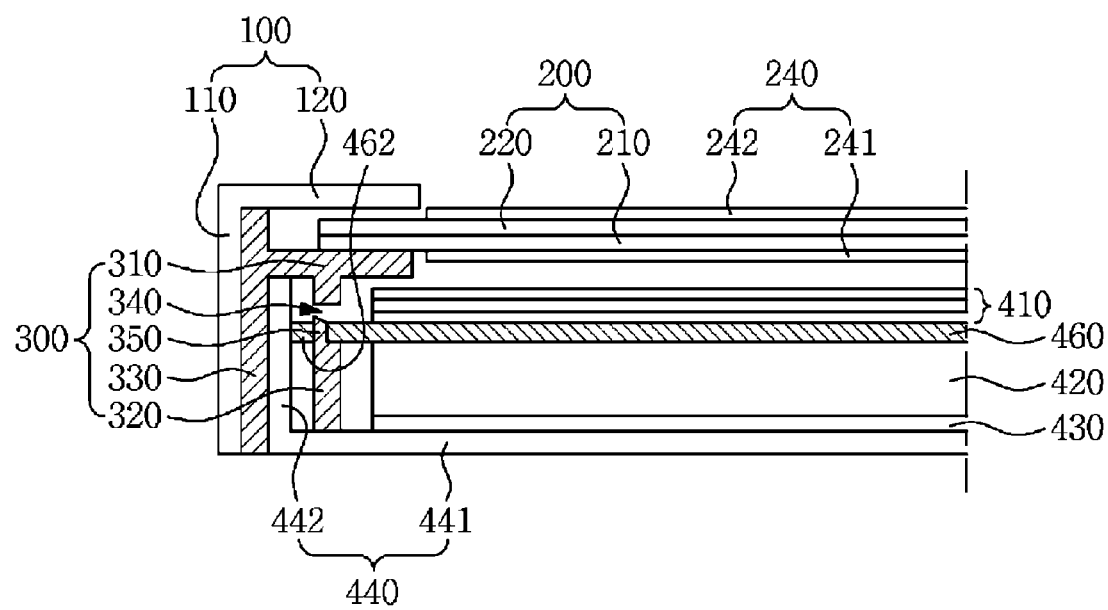
FIG. 2 is a cross-sectional view taken along line A-A' of FIG. 1.

FIG. 1 is a schematic exploded perspective illustrating a display device according to a first exemplary embodiment of the invention, and FIG. 2 is a cross-sectional view taken along line A-A' of FIG. 1.

Referring to FIGS. 1 and 2, the display device may include a display panel 200 configured to display images, a backlight assembly 400 configured to provide light to the display panel 200, a top chassis 100 provided in a form surrounding the display panel 200, and a mold frame 300 on which the display panel 200 is mounted.

The top chassis 100 may be coupled to a bottom chassis 440 so as to cover an edge portion of the display panel 200 mounted on the mold frame 300. The top chassis 100 may have an edge portion 110 coupled to the bottom chassis 440 and a protrusion 120 bent and extending from the edge portion 110. An edge portion of the display panel 200 covered by the top chassis 100 is a non-display area. The top chassis 100 may have an opening at a center portion thereof and the display panel 200 may be exposed therethrough.

The top chassis 100 may be coupled to the bottom chassis 440 by hooks and/or screws. Furthermore, the top chassis 100 and the bottom chassis 440 may be coupled to each other in many different structures.

The display panel 200 may be configured to display an image. The display panel 200 may be a light-receiving type display panel and may be categorized into an LCD panel, an electrowetting display panel, an electrophoretic display panel, a microelectromechanical system (MEMS) display panel, and the like. It is assumed that an LCD panel is used as one embodiment of the present invention.

The display panel 200 may be provided in a quadrilateral panel form having two pairs of parallel sides. According to the first exemplary embodiment, the display panel 200 may be rectangular in shape having a pair of long sides and a pair of short sides. The display panel 200 may include a first substrate 210, a second substrate 220 opposed to the first substrate 210, and a liquid crystal layer (not illustrated) interposed between the first and second substrates 210 and 220, respectively. The display panel 200, when viewed in a plane, may have a display area which displays an image and a non-display area which surrounds the display area and does not display an image. The non-display area may be covered by the top chassis 100.

The first substrate 210 may include a plurality of pixel electrodes (not illustrated) and a plurality of TFTs (not illustrated) electrically connected to the pixel electrodes in one-to-one correspondence. A data line may be connected to a source electrode of the TFT, a gate line may be connected to a gate electrode thereof, and a pixel electrode may be connected to a drain electrode thereof. Each TFT may function as a switch of a driving signal supplied to the corresponding pixel electrodes. Furthermore, the second substrate 220 may include a common electrode (not illustrated) that forms, along with the pixel electrodes, an electric field that controls an arrangement of the liquid crystals. The display panel 200 is configured to drive the liquid crystal layer to display an image frontward.

The display panel 200 may include: a driving chip (not illustrated) configured to apply a driving signal; a driving-chip mounting film (not illustrated) on which the driving chip is mounted; and a printed circuit board (PCB, not illustrated) electrically connected to the display panel 200 through the driving-chip mounting film. The driving-chip mounting film may be a tape carrier package (TCP).

The driving chip may generate a driving signal for driving the display panel 200 in response to an external signal. The external signal may be supplied from the PCB and may include image signals, various control signals, and a driving voltage.

For instance, the gate PCB may be connected to the gate driving-chip mounting film. The gate PCB may supply an image signal to the gate driving chip. The data PCB may be connected to the data driving-chip mounting film. The data PCB may supply an image signal to the data driving chip.

The gate driving chip may receive the image signal and supply a gate driving signal to the gate line. The data driving chip may receive the image signal and supply a data driving signal to the data line.

Polarizers 240 may be disposed on the display panel 200 and include first and second polarizers 241 and 242, respectively. The first and second polarizers 241 and 242, respectively, may be individually disposed on opposite sides of facing surfaces of the first and second substrates 210 and 220, respectively. That is, the first polarizer 241 may be attached on an outer side of the first substrate 210 and the second polarizer 242 may be attached on an outer side of the second substrate 220. A transmissive axis of the first polarizer 241 may be substantially at right angles to a transmissive axis of the second polarizer 242.

The mold frame 300 may be coupled to the bottom chassis 440 and accommodate the display panel 200. The mold frame 300 may include a flexible material such as plastics so as to prevent damage on the display panel 200.

The mold frame 300 may be provided along the edge portion of the display panel 200 and support the display panel 200 from the lower portion thereof. The mold frame 300 may be provided in areas corresponding to four sides or at least a part of the four sides of the display panel 200. For example, the mold frame 300 may have a quadrilateral-loop form corresponding to the four sides of the display panel 200, or may have a C-shape, that is, a quadrilateral open-loop form corresponding to three sides of the edge portion of the display panel 200.

The backlight assembly 400 may include an optical sheet 410, a light guide plate 420, a reflective sheet 430, the bottom chassis 440, a light source unit 450, and a light conversion sheet 460.

The light source unit 450 may include a light source 451 and a circuit board 452 on which the light source 451 is disposed. The light source unit 450 may be disposed at a corner portion or on a light incident side portion of the light guide plate 420. In other words, the light source unit 450 may emit light toward the corner portion or the light incident side portion of the light guide plate 420.

The light source 451 may include at least one LED chip (not illustrated) and a package (not illustrated) for accommodating the LED chip. The light source 451 may have a light emitting surface in a direction where the light guide plate 420 is disposed. The light emitted from the light source 451 may be blue light.

The circuit board 452 may include, for example, a PCB or a metal PCB.

Such a light source unit 450 may be provided on one, two or four side surfaces of the light guide plate 420 in consideration of size and luminance uniformity of the display panel 200. In some embodiments, the light source unit 450 may be formed on at least one corner portion of the light guide plate 420.

Light emitted from the light source 451 may be incident on a light-incident side surface of the light guide plate 420 and may be emitted to the light emitting surface thereof. The light guide plate 420 may be configured to uniformly supply light supplied from the light source unit 450 to the display panel 200. The light guide plate 420 may be disposed adjacent to the light source unit 450 and may be accommodated in the bottom chassis 440. The light guide plate 420 may be provided, for example, in a quadrilateral panel form as the display panel 200, but is not limited thereto. In some embodiments, when an LED is used as the light source 451, the light guide plate 420 may have various forms including a predetermined groove and/or a protrusion according to a position of the light source 451.

Although referred to as a "plate" for ease of description, the light guide plate 420 may be in the shape of a sheet or a film so as to achieve slimness of the display device. That is, light guide plate 420 is to be understood as having a concept that includes not only a plate but also a film for guiding light.

The light guide plate 420 may include a light-transmissive material. The light-transmissive material may include an acrylic resin, such as polymethylmethacrylate (PMMA), or polycarbonate (PC) so as to guide light efficiently.

A pattern may be formed on at least one surface of the light guide plate 420. For example, a scattering pattern (not illustrated) may be formed on a lower surface thereof so as to scatter and/or reflect the guided light upward.

The optical sheet 410 may be disposed on the light guide plate 420 and may be configured to diffuse and/or collect light directed from the light guide plate 420. The optical sheets 410 may include a diffusion sheet, a prism sheet, a protective sheet, and other functional sheets.

The diffusion sheet is configured to disperse light incident from the light guide plate 420 so as to thereby prevent the light from being partly concentrated.

The prism sheet may include prisms having a triangular cross-section and formed in a predetermined array on one surface thereof. The prism sheet may be disposed on the diffusion sheet and may collect light diffused from the diffusion sheet in a direction perpendicular to the display panel 200.

The protective sheet may be disposed on the prism sheet and may serve to protect a surface of the prism sheet and to diffuse light to achieve uniform light distribution.

The light conversion sheet 460 may convert a color of light emitted from the light source 451 and leaving the light guide plate 420. For instance, when blue light is provided from the light source 451 to the light guide plate 420, light leaving the light guide plate 420 may be blue light. The light leaving the light guide plate 420 may be converted into white light by the light conversion sheet 460.

The light conversion sheet 460 may include a polymer resin (not illustrated) and a plurality of quantum dots (not illustrated) dispersed in the polymer resin.

The polymer resin may be formed into an insulating polymer and may include, for example, silicon resins, epoxy resins, acrylic resins, or the like.

A quantum dot may be spherical in shape with a diameter in a range of several nanometers to tens of nanometers or to hundreds of nanometers. Furthermore, a quantum dot may be a kind of nanomaterial and include a core formed of materials having a small band gap, a shell surrounding the core and formed of materials having a large band gap, and a ligand bonded to the shell.

A quantum confinement effect may occur in quantum dots due to its nanoscaled dimensions. The quantum confinement effect may be characterized by a large bandgap and band gap discontinuity as in a single atom, as opposed to that of a bulk crystal structure. The size of the discontinuous bandgap becomes dependent on a size of the quantum dot, thereby providing the capability of adjusting the bandgap structure according to the size thereof. Quantum dots may be composed to have uniform size distribution so as to thereby form a light conversion element having spectral distribution of a narrow full width at half maximum. For example, as the size of the quantum dot increases, light having a longer wavelength may be emitted. Accordingly, the wavelength of emitted light can be adjusted by adjusting the size of quantum dots.

A quantum dot may absorb light directed from the light guide plate 420 and then emit light having a wavelength that corresponds to a band gap of the corresponding quantum dot.

In detail, when light emitted from the light source 451 is called a first light and light emitted from a quantum dot is called a second light, wavelength of the first light may have a wavelength shorter than or equal to that of the second light. This is attributable to an energy law, and the wavelength of the second light is longer than or equal to that of the first light because the quantum dot cannot emit light having energy greater than that of the absorbed light.

A quantum dot may include II-VI-based quantum dots, such as ZnS, ZnSe, ZnTe, CdS, CdSe, CdTe, HgS, HgSe and HgTe, or III-V-based quantum dots, such as PbS, PbSe, PbTe, AlN, AlP, AlAs, AlSb, GaN, GaAs, GaSb, InN, InP, InAs, and InSb.

When the light source 451 is a blue LED, the light conversion sheet 460 may include at least one of a first quantum dot emitting green light and a second quantum dot emitting red light. The second quantum dot may have a greater diameter than the first quantum dot.

Examples of the first quantum dot that emits green light may include, for example, a manganese-doped zinc silicon oxide (e.g., $Zn_2SiO_4:Mn$) phosphor, a europium-doped strontium gallium sulfide (e.g., $SrGa_2S_4:Eu$) phosphor, or a europium-doped barium silicon oxide chloride (e.g., $Ba_5Si_2O_7Cl_4$) phosphor.

Examples of the second quantum dot that emits red light may include, for example, a praseodymium or aluminum-doped strontium titanium oxide (e.g., $SrTiO_3:Pr,Al$) phosphor or a praseodymium-doped calcium titanium oxide (e.g., $CaTiO_3:Pr$) phosphor.

When the light conversion sheet 460 includes the first and second quantum dots, white light may be emitted from the light conversion sheet 460 by mixing red, green, and blue light.

The reflective sheet 430 may be disposed between the light guide plate 420 and the bottom chassis 440 and reflects light emitted downward from the light guide plate 420 to be directed toward the display panel 200, thereby improving light efficiency.

The reflective sheet 430 may include, for example, polyethylene terephthalate (PET), and thus it may have reflectivity. One surface of the reflective sheet 430 may be coated with a diffusion layer including, for example, titanium dioxide.

In some embodiments, the reflective sheet 430 may be formed of a material containing metal, such as silver (Ag).

The bottom chassis 440 may accommodate the reflective sheet 430 and the light guide plate 420. The bottom chassis 440 may have a bottom portion 441 and a side surface portion 442 bent from the bottom portion 441. The bottom portion 441 of the bottom chassis 440 may be parallel to the light guide plate 420. The bottom chassis 440 may include rigid metal materials, such as stainless steel, or materials having good heat dissipation properties, such as aluminum or an aluminum alloy. According to the first exemplary embodiment, the bottom chassis 440 may be responsible for maintaining a framework of the display device and protecting a variety of components accommodated therein.

With the above-described configuration of a display device, the mold frame 300 and the light conversion sheet 460 that are configured to prevent blue light leakage are described below in more detail with reference to FIGS. 2 to 7B.

Figure 3:
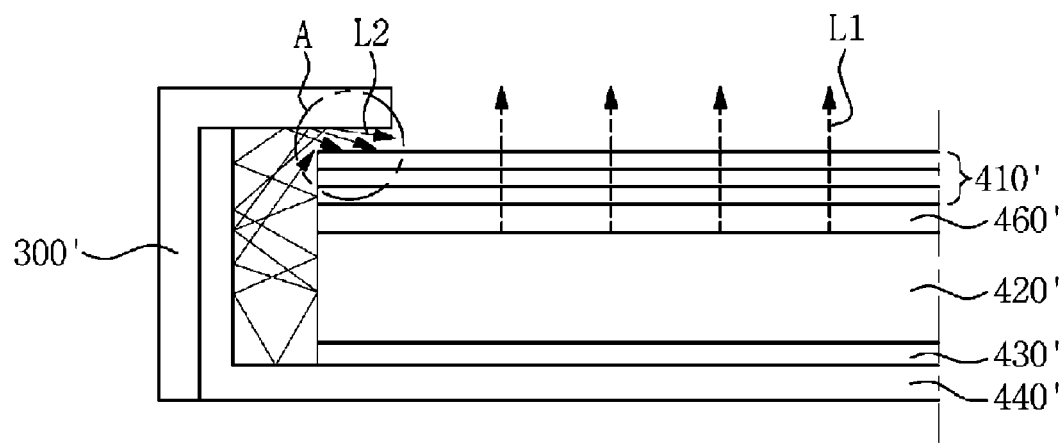
FIG. 3 is a schematic cross-sectional view illustrating blue light leaking from a conventional display device.
Figure 4:
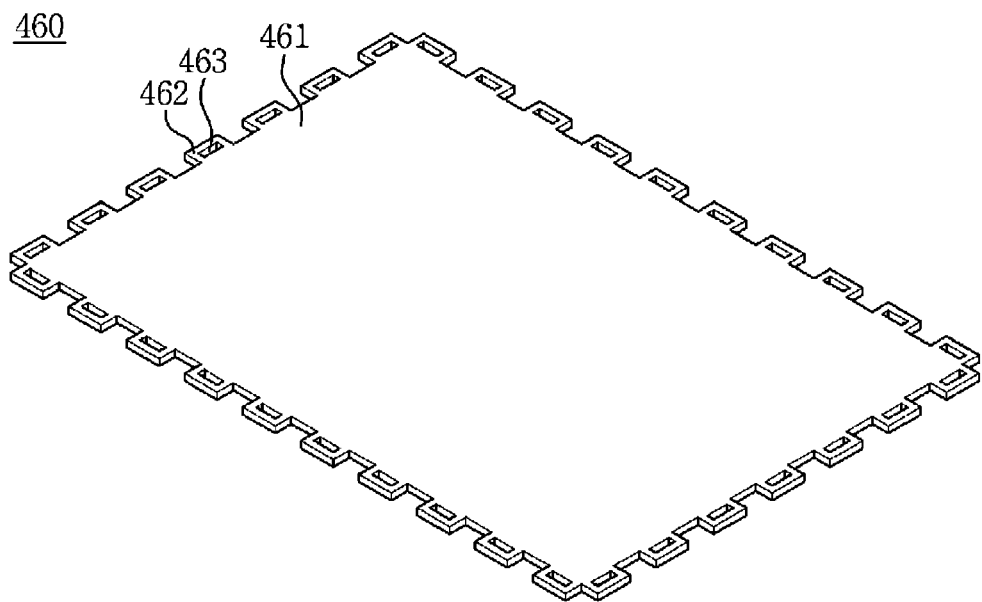
FIG. 4 is a schematic perspective view illustrating a light conversion sheet of FIG. 1.
Figure 5:
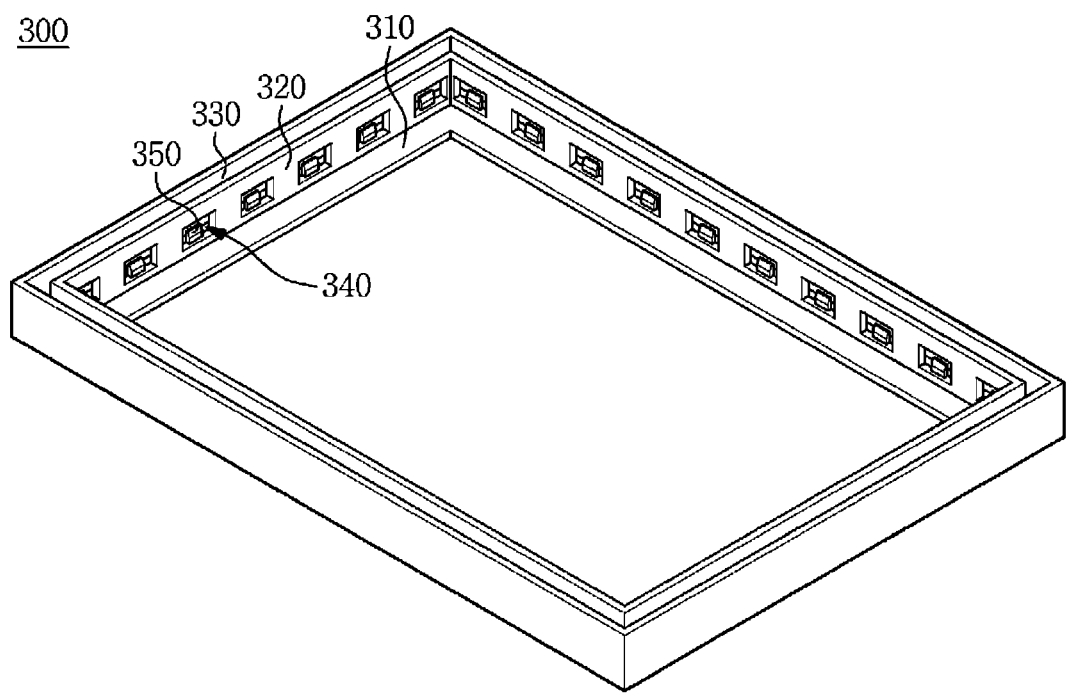
FIG. 5 is a schematic perspective view illustrating a mold frame of FIG. 1.
Figure 6A:
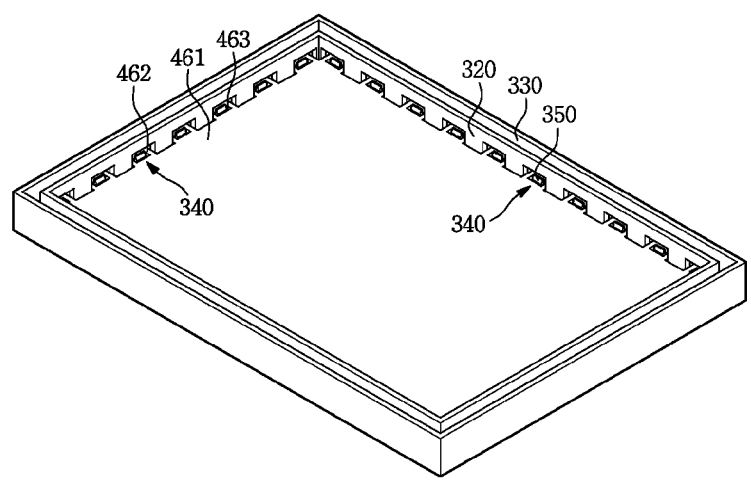
FIG. 6A is a schematic perspective view illustrating coupling of the light conversion sheet and a mold frame of FIG. 1.
Figure 6B:
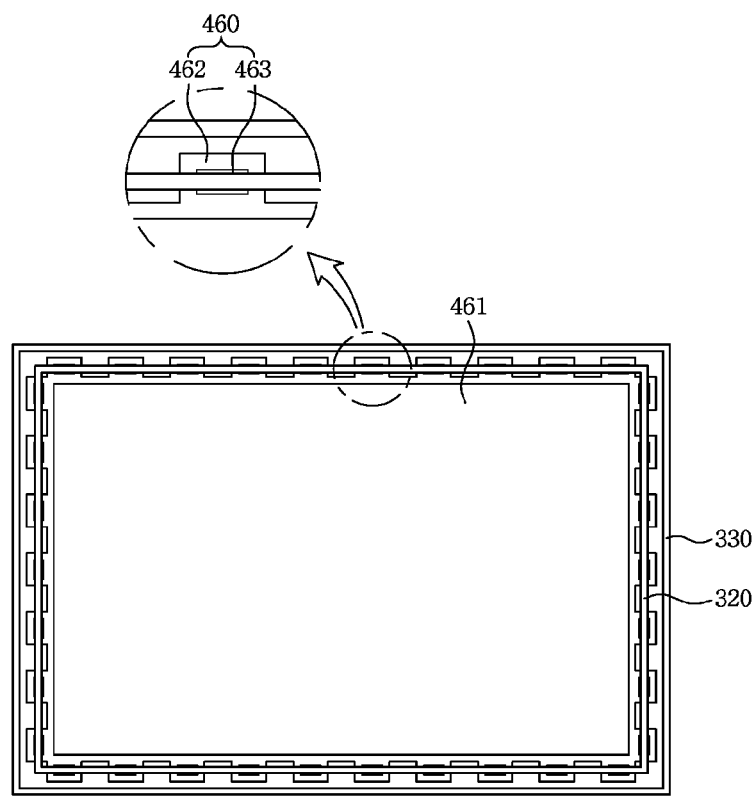
FIG. 6B is a schematic plan view illustrating the light conversion sheet and the mold frame of FIG. 1.
Figure 7A:
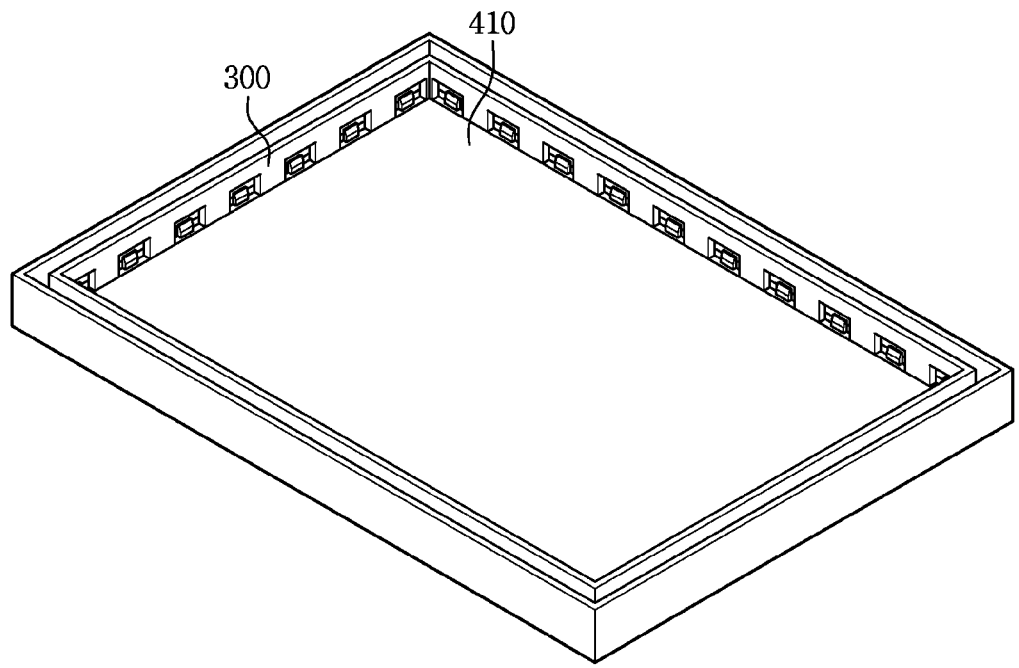
FIGS. 7A and 7B are schematic perspective views illustrating a method of coupling a light conversion sheet to a mold frame.
Figure 7B:
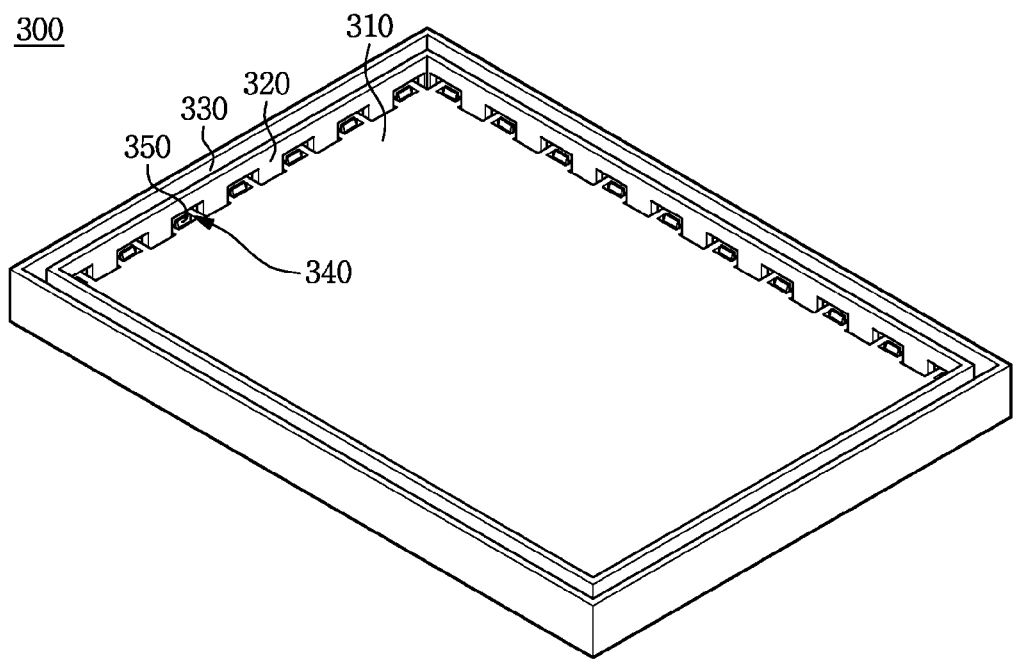

FIG. 3 is a schematic cross-sectional view illustrating blue light leaking from a conventional display device, FIG. 4 is a schematic perspective view illustrating a light conversion sheet of FIG. 1, FIG. 5 is a schematic perspective view illustrating a mold frame of FIG. 1, FIG. 6A is a schematic perspective view illustrating coupling of the light conversion sheet and a mold frame of FIG. 1, FIG. 6B is a schematic plan view illustrating the light conversion sheet and the mold frame of FIG. 1, and FIGS. 7A and 7B are schematic perspective views illustrating a method of coupling a light conversion sheet to a mold frame.

Referring to FIGS. 2, 4, and 5, the light conversion sheet 460 may have a sheet body 461 and a sheet guide portion 462 extending outwardly of the sheet body 461. The light conversion sheet 460 may have, at an edge portion, a coupling hole 463 into which a projection 350 is inserted.

In detail, at least one sheet guide unit 462 may be formed along a side surface of the light conversion sheet 460. The sheet guide units 462 may be formed on at least two sides of the sheet body 461. In some embodiments, the sheet guide units 462 may be formed on four sides of the sheet body 461.

The sheet guide unit 462 may have the coupling hole 463 into which the projection 350 is coupled. The sheet guide unit 462 and the coupling hole 463 may be provided in plural so as to correspond to the number of inserting holes 340 and the projections 350 of the mold frame 300.

Meanwhile, the sheet guide unit 462 may be in contact with the side surface portion 442 of the bottom chassis 440. That is, the light conversion sheet 460 may extend to the side surface portion 442 of the bottom chassis 440, which is different from conventional display devices. Accordingly, the light conversion sheet 460 may have a larger size compared to the light guide plate 420 and the optical sheet 410. Furthermore, as a side surface of the light conversion sheet 460 is brought into contact with the side surface portion 442 of the bottom chassis 440, quantum dots may not be exposed outwardly through the side surface of the light conversion sheet 460.

Such a mold frame 300 may include a support 310 on which the display panel 200 is disposed, a sidewall portion 320 bent from one surface of the support 310, and the projection 350.

The support 310 may be disposed along an edge portion of the display panel 200 so as to allow the display panel 200 to be mounted thereon. The support 310 may be coupled to the side surface portion 442 of the bottom chassis 440 using hooks and/or screws.

Meanwhile, the mold frame 300 may further include a locking protrusion 330 bent from the support 310 and coupled to the bottom chassis 440. When the locking protrusion 330 is provided in the mold frame 300, the locking protrusion 330 may be directly coupled to the side surface portion 442 of the bottom chassis 440 using hooks and/or screws.

As illustrated in FIG. 5, the projection 350 may protrude from the sidewall portion 320. The projection 350 may have a size substantially the same as or less than that of the coupling hole 463 of the light conversion sheet 460 so as to allow projection 350 to be inserted into the coupling hole 463. Furthermore, the projection 350 may have less thickness compared to the sidewall portion 320. The projection 350 may be formed on the sidewall portion 320 more adjacent to the side surface portion 442 of the bottom chassis 440 than the light guide plate 420.

The sidewall portion 320 may be disposed between the side surface portion 442 of the bottom chassis 440 and the light guide plate 420. The sidewall portion 320 may have the inserting hole 340, and the projection 350 may be disposed in the inserting hole 340. Meanwhile, the sidewall portion 320 may have at least one inserting hole 340 along an edge portion of the light conversion sheet 460.

Referring to FIGS. 6A and 6B, the light conversion sheet 460 may be coupled to the mold frame 300 with the above described structure. The sheet guide unit 462 of the light conversion sheet 460 may be disposed in the inserting hole 340 of the sidewall portion 320 and the projection 350 of the sidewall portion 320 may be inserted in the coupling hole 463 of the sheet guide unit 462. As the light conversion sheet 460 is coupled to the mold frame 300, the locking protrusion 330 of the mold frame 300 may limit the position of an outer surface of the light conversion sheet 460.

Referring to FIG. 3, in conventional display devices, a reflective sheet 430', a light guide plate 420', a light conversion sheet 460', and an optical sheet 410' may be sequentially disposed on a bottom chassis 440', and the mold frame 300 may be disposed on the bottom chassis 440' spaced apart from the reflective sheet 430' and the optical sheet 410'. Blue light L1, conventionally leaking through a gap A between the mold frame 300 and the light conversion sheet 460, may not be converted to white light L1, which leads to low color reproducibility. Accordingly, when the light conversion sheet 460 is formed in a large size as described above, blue light may not leak and color reproducibility of display devices can be improved.

Meanwhile, referring to FIGS. 7A and 7B, the light conversion sheet 460 (not shown in FIG. 7A but shown in FIGS. 1 and 2) and the optical sheet 410 may be coupled to the mold frame 300 and may be accommodated in the bottom chassis 400. A method of manufacturing conventional backlight units is as follows: the light conversion sheet 460 and the optical sheet 410 are sequentially disposed on the light guide plate 420 and the mold frame 300 is coupled to the bottom chassis 440. However, since the light conversion sheet 460 according to the first exemplary embodiment is directly coupled to the mold frame 300, the optical sheet 410 and the light conversion sheet 460 may be assembled to the mold frame 300, and then the mold frame 300 may be coupled to the bottom chassis 440.

Hereinafter, a second exemplary embodiment of the present invention is described below with reference to FIG. 8. Configurations identical to those in the first exemplary embodiment may be omitted for conciseness.

Figure 8:
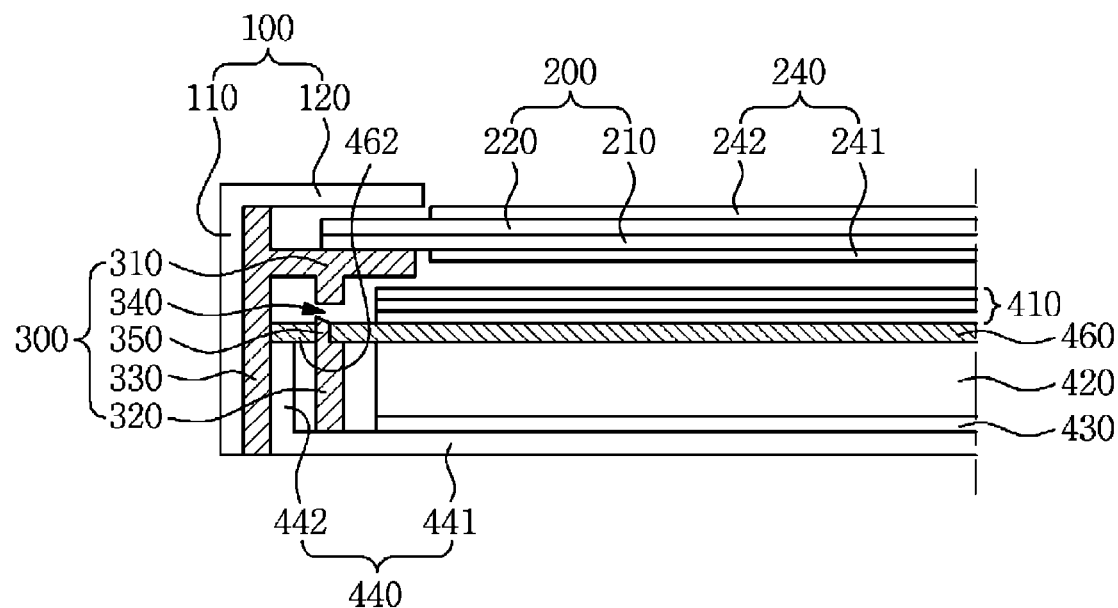
FIG. 8 is a schematic cross-sectional view illustrating a display device according to a second exemplary embodiment of the invention.

FIG. 8 is a schematic cross-sectional view illustrating the display device according to the second exemplary embodiment of the invention;

Referring to FIG. 8, a light conversion sheet 460 according to the second exemplary embodiment may be disposed on a top surface of a side surface portion 442 of a bottom chassis 440. That is, the side surface portion 442 of the bottom chassis 440 of FIG. 8 may have a height lower than the side surface portion 442 in the first exemplary embodiment of FIG. 2, and the light conversion sheet 460 may have a larger size.

Hereinafter, a third exemplary embodiment of the present invention is described with reference to FIG. 9. Configurations identical to those in the first exemplary embodiment may be omitted for conciseness.

Figure 9:
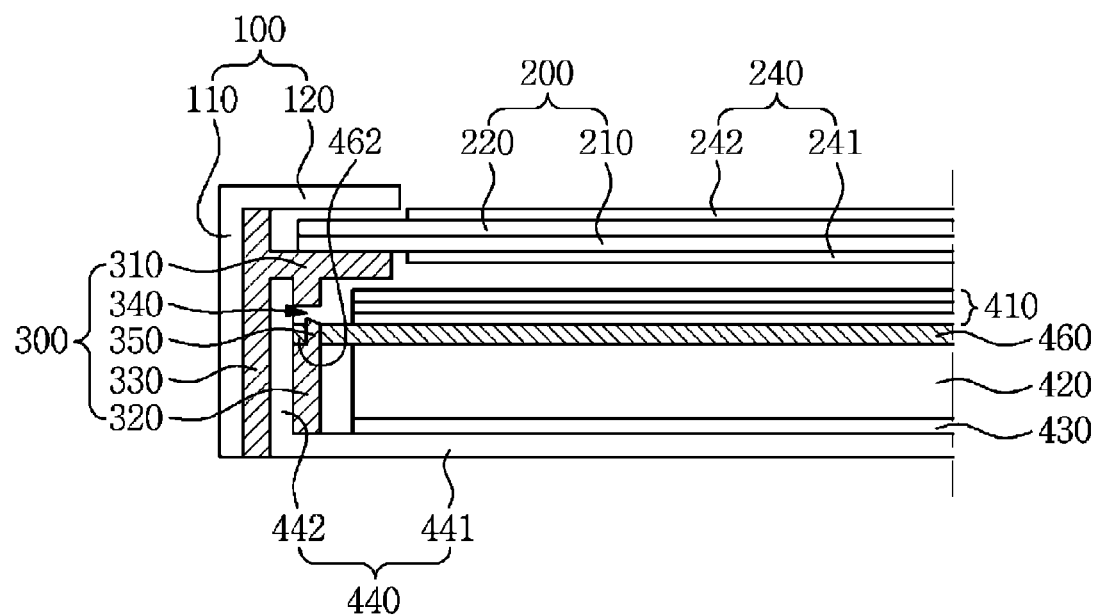
FIG. 9 is a schematic cross-sectional view illustrating a display device according to a third exemplary embodiment of the invention.

FIG. 9 is a schematic cross-sectional view illustrating a display device according to a third exemplary embodiment of the invention.

According to the third exemplary embodiment, a sidewall portion 320 of a mold frame 300 and a sheet guide unit 462 may be, as illustrated in FIG. 9, in contact with a side surface portion 442 of a bottom chassis 440. That is, the sidewall portion 320 may not be spaced apart from the side surface portion 442 of the bottom chassis 440 as in the first exemplary embodiment, but may be brought into contact with the side surface portion 442. Accordingly, the sheet guide unit 462 may extend only to a top surface of the sidewall portion 320 and a projection 350 may be formed on the sidewall portion 320 more adjacent to a light guide plate 420 rather than side surface portion 442 of the bottom chassis 440.

Hereinafter, a fourth exemplary embodiment of the present invention is described with reference to FIGS. 10 to 12. Configurations identical to those in the first exemplary embodiment may be omitted for conciseness.

Figure 10:
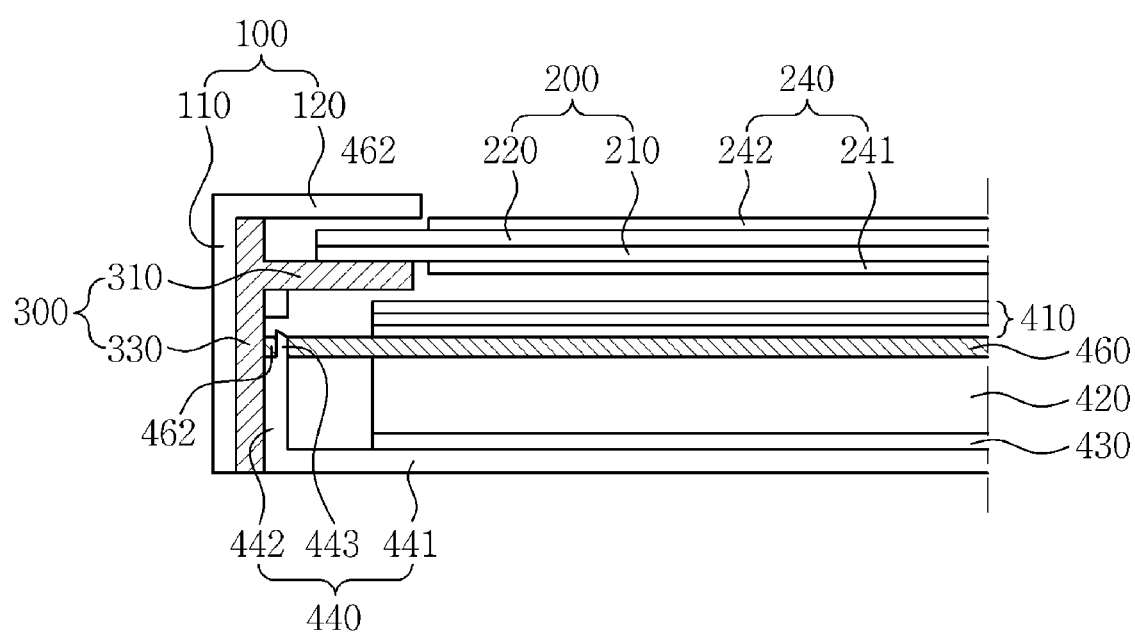
FIG. 10 is a schematic cross-sectional view illustrating a display device according to a fourth exemplary embodiment of the invention.
Figure 11:
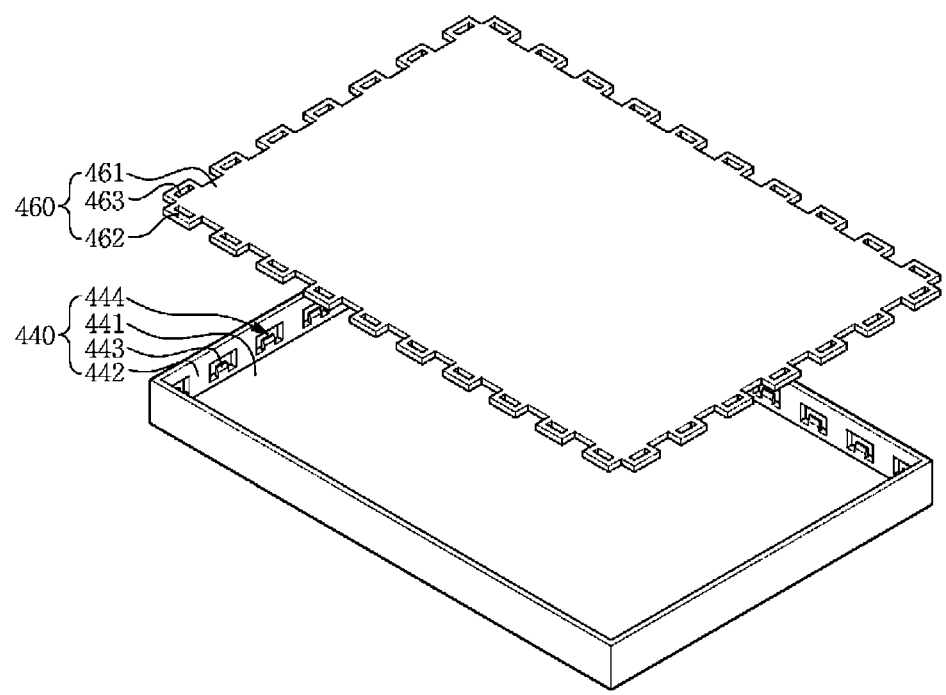
FIG. 11 is a schematic exploded perspective view illustrating a bottom chassis and a mold frame of FIG. 10.
Figure 12:
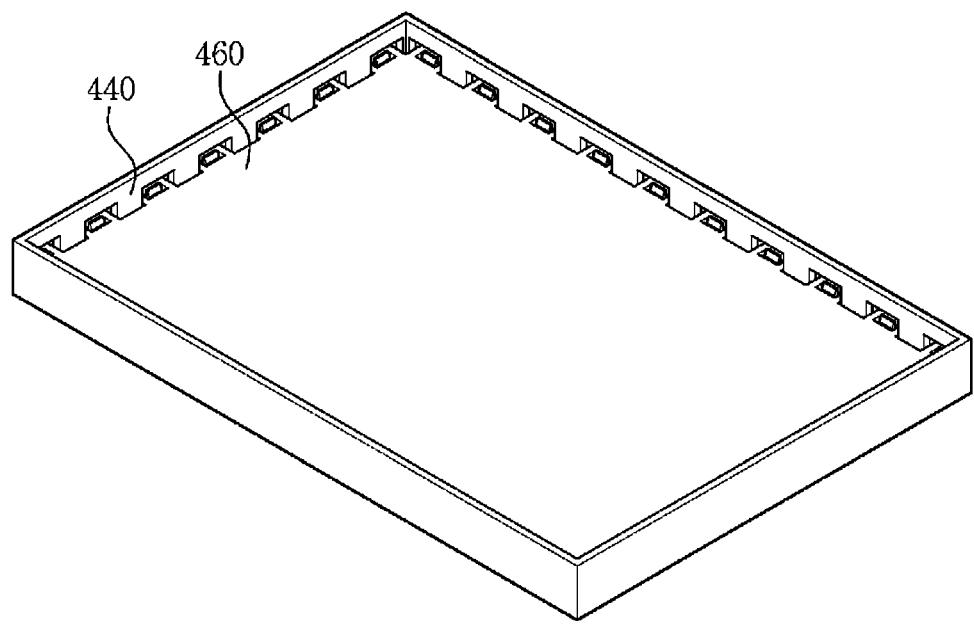
FIG. 12 is a schematic perspective view illustrating coupling of the bottom chassis and the mold frame of FIG. 10.

FIG. 10 is a schematic cross-sectional view illustrating the display device according to the fourth exemplary embodiment of the invention, FIG. 11 is a schematic exploded perspective view illustrating a bottom chassis and a mold frame of FIG. 10, and FIG. 12 is a schematic perspective view illustrating coupling of the bottom chassis and the mold frame of FIG. 10.

Referring to FIGS. 10 to 12, in the display device according to the fourth exemplary embodiment, a sidewall portion 320 of a mold frame 300 illustrated in FIG. 2 may not be provided. Furthermore, a locking projection 443 and a locking hole 444 may be formed on a side surface portion 442 of a bottom chassis 440.

In detail, the mold frame 300 may include a support 310 and a locking protrusion 330. The support 310 may support a display panel 200 and the locking protrusion 330 may be coupled to the bottom chassis 440.

The side surface portion 442 of the bottom chassis 440 may have the locking projection 443. The locking projection 443 may protrude from the side surface portion 442 as illustrated in FIG. 11. The locking projection 443 may have a size substantially equivalent to or less than that of a coupling hole 463 of a light conversion sheet 460 so as to thereby allow the coupling hole 463 to be inserted thereto.

The side surface portion 442 may have the locking hole 444, and the locking projection 443 may be disposed in the locking hole 444. The sheet guide unit 462 may be coupled to the locking projection 443. Meanwhile, the side surface portion 442 may have at least one locking hole 444 along an edge portion of the light conversion sheet 460.

In the display device according to the fourth exemplary embodiment, the light conversion sheet 460 may be coupled to the bottom chassis 440. In order to increase the size of the light conversion sheet 460, the light conversion sheet 460 may be coupled to the mold frame 300 or the bottom chassis 440.

From the foregoing, it will be appreciated that various embodiments in accordance with the present disclosure have been described herein for purposes of illustration, and that various modifications may be made without departing from the scope and spirit of the present invention. Accordingly, the various embodiments disclosed herein are not intended to be limiting of the true scope and spirit of the present invention. Various features of the above described and other embodiments can be mixed and matched in any manner so as to produce further embodiments consistent with the invention.

What is claimed is:

1. A display device, comprising:
   a display panel;
   a light source configured to provide light to the display panel;
   a bottom chassis on which the light source is disposed;
   a mold frame coupled to the bottom chassis, the mold frame comprising a support on which the display panel is disposed, a sidewall portion extending from one surface of the support, and a projection protruding from the sidewall portion, the sidewall portion being perforated by a through hole and the projection being arranged within the through hole, the mold frame being comprised of a flexible material, the mold frame being a single integrated monolithic unit; and
   a light conversion sheet disposed between the display panel and the bottom chassis, the light conversion sheet including a sheet body that includes a plurality of quantum dots dispersed in a polymer resin to convert a color of light emitted from the light source, wherein the light conversion sheet further includes an edge portion that includes a coupling hole into which the projection is inserted.

2. The display device of claim 1, wherein the sidewall portion is perforated by a plurality of through holes spaced apart from each other, each of the through holes includes a projection arranged within, wherein the light conversion sheet further comprises a sheet guide unit extending outwardly from the sheet body only at portions of an outer periphery of the sheet body that correspond to ones of the through holes, wherein the sheet guide unit includes a plurality of coupling holes into which the projections are inserted.

3. The display device of claim 2, wherein the sheet guide unit is disposed within the inserting holes and contacts a side surface portion of the bottom chassis.

4. The display device of claim 3, wherein the mold frame further comprises a locking protrusion also extending from the support and coupled to the bottom chassis.

5. The display device of claim 4, wherein the bottom chassis further comprises a bottom portion, wherein the side surface portion extends from the bottom portion.

6. The display device of claim 5, wherein the side surface portion is disposed between the sidewall portion of the mold frame and the locking protrusion.

7. The display device of claim 5, wherein the sidewall portion is in contact with the side surface portion of the bottom chassis.

8. The display device of claim 5, wherein the sheet guide unit is disposed on a top surface of the side surface portion of the bottom chassis.

9. The display device of claim 1, further comprising a light guide plate disposed between the bottom chassis and the light conversion sheet and configured to direct light emitted from the light source to the display panel.

10. The display device of claim 9, further comprising a plurality of optical sheets arranged between the light guide plate and the display panel, the plurality of optical sheets including a diffusion sheet to disperse light, a prism sheet to collect light from the diffusion sheet and a protective sheet to protect a surface of the prism sheet, the optical sheets being distinguished from the light conversion sheet.

11. The display device of claim 10, wherein the light conversion sheet has a size larger than a size of the optical sheets, wherein the light source emits only blue light and the light conversion member converts said blue light into white light for the display panel, wherein the mold frame and the light conversion sheet are configured to prevent the blue light produced by the light source from leaking directly into the display panel.

12. The display device of claim 9, wherein the light conversion sheet has a size larger than a size of the light guide plate.

13. The display device of claim 1, wherein the projection has a thickness less than a thickness of the sidewall portion.

14. A display device, comprising:
   a display panel;
   a light source configured to provide light to the display panel;
   a bottom chassis on which the light source is disposed;
   a mold frame coupled to the bottom chassis and comprising a projection; and a light conversion sheet disposed between the display panel and the bottom chassis, wherein the light conversion sheet has, at an edge portion thereof, a coupling hole into which the projection is inserted, wherein the mold frame comprises:

a support on which the display panel is disposed; and a sidewall portion extending from one surface of the support, wherein the projection protrudes from the sidewall portion, wherein the sidewall portion has an inserting hole and the projection is disposed in the inserting hole, wherein the light conversion sheet comprises a sheet body and a sheet guide unit extending outwardly from the sheet body, and wherein the sheet guide unit includes the coupling hole into which the projection is inserted, wherein the sheet guide unit is disposed in the inserting hole, wherein the mold frame further comprises a locking protrusion bent from the support and coupled to the bottom chassis, wherein the bottom chassis further comprises a bottom portion and a side surface portion bent from the bottom portion, wherein the sidewall portion and the sheet guide unit are in contact with the side surface portion of the bottom chassis.

15. A display device, comprising:

a display panel;

a light source configured to emit blue light;

a bottom chassis on which the light source is disposed, wherein the bottom chassis includes a bottom portion and a side surface portion bent from the bottom portion, the bottom chassis further comprising a locking projection; and a light conversion sheet including a sheet body portion arranged between the display panel and the bottom chassis to convert the blue light emitted by the light source into white light for the display panel, the light conversion sheet including a plurality of first quantum dots to produce green light and a plurality of second quantum dots to produce red light from the blue light, the white light being a mixture of the green, blue and red light;

wherein the light conversion sheet further includes a sheet guide portion extending outward from the sheet body portion at a peripheral edge of the sheet body portion, the sheet guide portion including a coupling hole into which the locking projection is inserted, wherein the side surface portion of the bottom chassis is perforated by a plurality of locking holes spaced-apart from each other, wherein the sheet guide portion of the light conversion sheet extends outward from an outer periphery of the sheet body portion only at locations on the outer peripheral edge of the sheet body portion that correspond to the locking holes on the side surface portion of the bottom chassis, wherein the sheet guide portion is absent of any quantum dots.

16. The display device of claim 15, wherein the locking projection is disposed within one of the locking holes.

\* \* \* \* \*